United States Patent [19]
Sayers et al.

[11] 3,727,612
[45] Apr. 17, 1973

[54] DIALYSIS METHOD AND APPARATUS

[76] Inventors: Robert S. Sayers, 18710 Prince Williams Lane, Houston, Tex. 77058; Joseph G. Bohorfoush, 293 Youngblood Circle, Milledgeville, Ga. 31061

[22] Filed: Jan. 18, 1971

[21] Appl. No.: 107,107

[52] U.S. Cl. ............... 128/214 R, 23/258.5, 210/22, 210/321
[51] Int. Cl. ............................................. B01d 13/00
[58] Field of Search .............................. 210/22, 321; 23/258.5; 128/214 R

[56] References Cited

UNITED STATES PATENTS

| | | | |
|---|---|---|---|
| 3,228,877 | 1/1966 | Mahon | 210/22 |
| 3,527,700 | 9/1970 | Goldhaber | 210/22 |
| 2,411,238 | 11/1946 | Zender | 210/22 |
| 3,212,498 | 10/1965 | McKirdy et al. | 210/22 X |
| 3,619,423 | 11/1971 | Gulletti et al. | 210/23 X |
| 3,506,126 | 4/1970 | Sentess et al. | 210/321 X |
| 3,669,880 | 6/1972 | Marantz et al. | 210/22 |

FOREIGN PATENTS OR APPLICATIONS

| | | | |
|---|---|---|---|
| 1,198,032 | 7/1970 | Great Britain | 210/321 |

OTHER PUBLICATIONS

Transactions American Society for Artificial Internal Organs, Volume XV, pp. 353–358, May–June 1969

*Primary Examiner*—Samih N. Zaharna
*Assistant Examiner*—Richard Barnes
*Attorney*—Carlos A. Torres

[57] ABSTRACT

A method of dialytic conditioning of blood in which the blood is continuously circulated through a dialytic exchange member comprising an elongated tubular chamber having at least one semipermeable tubing member longitudinally disposed therein. In a preferred embodiment a plurality of semipermeable tubes are concentrically disposed in the tubular chamber, allowing circulation of blood and one, two or more dialysis fluids simultaneously.

3 Claims, 5 Drawing Figures

PATENTED APR 17 1973 3,727,612
FIG. 1
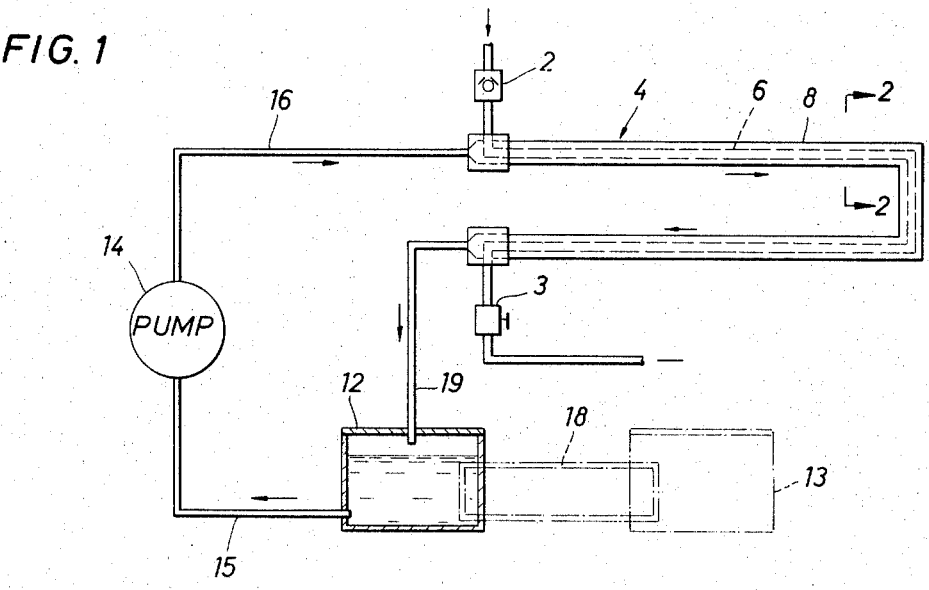
FIG. 2
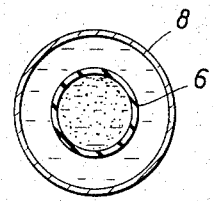
FIG. 3
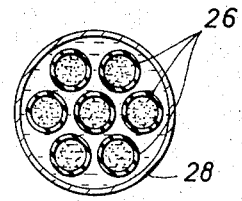
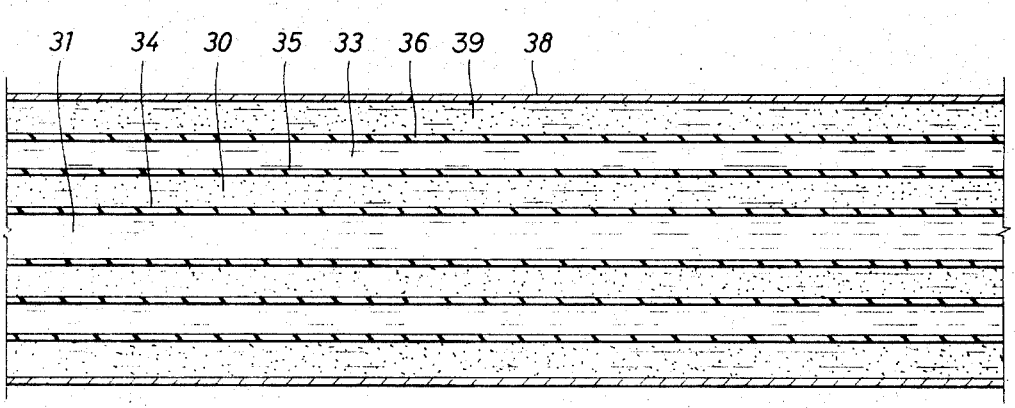
FIG. 5
FIG. 4
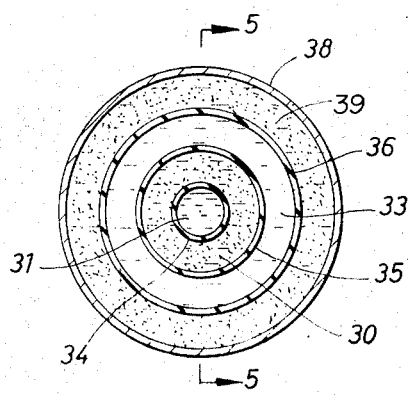
Joseph G. Bohorfoush
Robert S. Sayers
INVENTORS
BY
Carlos A. Torres
ATTORNEY

DIALYSIS METHOD AND APPARATUS

BACKGROUND OF THE INVENTION

1. Field of the Invention

This invention relates to dialytic methods and apparatus. More specifically, it concerns dialytic apparatus and methods useful in conditioning human blood.

2. Description of the Prior Art

The phenomena of dialysis is well known and it has been recognized, for some time, that human blood may be conditioned through dialytic action with a selected exchange fluid to remove harmful blood constituents or add useful constituents to blood deficient in particular constituents.

Artificial Kidneys, heart-lungs and other apparatus are currently used to replace kidneys, lungs and other body organs for temporary periods of time, for example during surgery. A thorough discussion of the present state of the artificial lung art is given by Pierce, *The Membrane Lung — Its Excuse, Present Status, and Promise*, Vol. XXXIV, No. 5, JOURNAL OF THE MOUNT SINAI HOSPITAL 437 (Sept. 1967). U.S. Pat. No. 3,508,662 — Miller, issued on Apr. 28, 1970, is a representative example of current development in artificial kidneys.

Current dialytic methods of organ replacement on a temporary basis, in most cases, require large, expensive and complex apparatus and in certain instances require whole blood to be added to the patient's blood supply to permit the apparatus to operate. Not only is the apparatus bulky and expensive, but in many cases, it is not available at all. For example, many people in the United States die each year because of the unavailability of artificial kidney machines to those suffering from disease or surgical procedures in which the kidney may cease functioning or need assistance on a temporary basis. An artificial kidney patient may require the use of a machine for 8 hours out of every 48 at a cost of approximately $20,000 per year, including professional medical services.

Furthermore, operation of current machines normally requires professionally trained medical personnel due to the complexity of the machines. In addition, because of exchange inefficiencies, some machines require large amounts of the blood to be circulated outside the body, increasing blood flow resistance and requiring pump assistance to the heart. This can introduce traumatic forces which may produce hemolysis or other damage to the blood. Life expectancy for patients requiring use of current artificial kidneys is on the order of five years.

SUMMARY OF THE INVENTION

The present invention provides an improved method and apparatus for dialysis of the blood. Basically, blood from a patient's body is circulated, by the patient's heart, through a dialytic exchange member comprising one or more tubes of semipermeable material longitudinally disposed inside a larger nonpermeable tube. Dialysis takes place between the blood and an exchange fluid through the semipermeable material. The exchange fluids and semipermeable materials are selected for the particular blood constituent to be removed or added. The exchange fluid is forced through the exchange member by a pump and returned to an exchange fluid reservoir where it may be discarded or reconditioned.

The particular method of operation and design of the invention provides a more efficient, economical and available method for conditioning blood. Although it is not limited to such, it is particularly useful as an artificial kidney. It may also be used to remove harmful blood constituents, such as poisons and barbiturates, or for oxygenation of the blood, such as required during surgery or due to arteriosclerosis. The apparatus is simple, compact, portable and may be easily adapted for disposable components. Furthermore, it is less damaging to the blood than many others due to the reduced flow resistance resulting from a lower ratio of blood volume to semipermeable tubing surface area.

Other objects and advantages will be understood from the description of the preferred embodiments of the invention which follows.

BRIEF DESCRIPTION OF THE DRAWINGS

In the description, reference will be made to the accompanying drawings in which:

FIG. 1 is a schematic representation of a system for dialysis of the blood according to a preferred embodiment of the invention;

FIG. 2 is a cross-section of the dialytic exchange member of FIG. 1 taken along line 2—2 thereof;

FIG. 3 is a cross-section of a dialytic exchange member similar to FIG. 2 showing an alternate embodiment of the invention;

FIG. 4 is a cross-section of a dialytic exchange member showing a particularly significant alternate embodiment of the invention; and FIG. 5 is a longitudinal cross-section of the dialytic exchange member of FIG. 4 taken along line 5—5 thereof.

DESCRIPTION OF THE PREFERRED EMBODIMENTS

Referring first to FIGS. 1 and 2, a general description of the invention will be given. Blood is introduced from a patient's body to the system through inlet connector and control means 2. The control means may consist of nothing more than a check valve or a hand regulated flow restricting device. Normally, no pumping device is required to assist blood flow. However, if pressure conditions dictate such assistance, it may be provided prior to entry into the dialytic exchange member 4. Exchange member 4 comprises at least one tube 6 of sermipermeable material, longitudinally disposed in an outer nonpermeable tube 8. The exchange member 4 may conform to a single longitudinal run, a U shape as shown, a spiral configuration or any other suitable shape and may be connected in series with a plurality of such members to form a larger unit.

The blood passes through the exchange member 4 on one side of the semipermeable tubing 6, in this case, its interior. The other side of the tubing 6, the annulus surrounding tubing 6 in the illustrative case, is in contact with an exchange fluid supplied from reservoir 12 by pump 14 through suction and discharge lines 15 and 16, respectively. Of course, dialysis occurs through the semipermeable membrane of tubing 6. Although flow of blood and dialysis fluid is indicated as being in the same direction a counterflow may actually increase the efficiency of dialysis. Dialysis efficiency may also be increased by fluctuation of the pressure of the exchange fluid through any suitable manner. This action may also assist the heart in inducing flow of blood through exchange chamber 4. For example, a check valve may be provided at 2 and a pulsating pressure induced in exchange member 4 (for example, 60 cycles/min.) to compress the blood carrying member and assist blood flow in the manner of a pump. Pulsating pressure could be provided by the dialysis fluid through pump 14.

The material of tubing 6 and the exchange fluid selected depend on the constituents to be added to, or removed from, the blood. Particularly for oxygenation and carbon dioxide removal, the most satisfactory tubing material is apparently a suitable form of silicone rubber. Very thin teflon membrane has also been used satisfactorily. Plant cellulose materials may also be used.

A number of dialyzing fluids are known in the art. The term "fluid" as used herein, of course, includes both liquids and gases. Some highly effective dialyzing fluids may be harmful to membrane materials or hazardous to the blood. If it is desired to use such a fluid without direct membrane contact, a second exchange reservoir 13 may contain such as a secondary fluid for conditioning the primary dialysis fluid in reservoir 12. The secondary fluid may be circulated through exchange loop 18, where secondary dialysis takes place through a semipermeable membrane portion thereof.

After the blood has undergone conditioning in exchange member 4, it is returned through outlet connector and control means 3 to the patient's body. An air-gas bubble trap (not shown) may be added at this point. The dialysis fluid is returned to reservoir 12 through return line 19 for reconditioning or disposal.

FIG. 3 discloses an alternate design for the dialytic exchange member. In such an embodiment the outer chamber or nonpermeable tube 28 may encase a plurality of smaller parallel semipermeable tubes 26. The blood may be passed through the tubes 26, surrounded by a dialyzing fluid, or vice versa.

FIGS. 4 and 5 disclose a particularly significant embodiment in which a plurality of semipermeable tubes 34, 35, 36 may be concentrically disposed within the outer chamber 38 of nonpermeable material. This allows conditioning with a plurality of dialysis fluids. For example, a first dialysis fluid 31 may be pumped through the innermost tube 34 for removal or addition of one blood constituent while a second dialysis fluid 33 may be pumped through the annulus between tubes 35 and 36 for removal or addition of another blood constituent. For example, carbon dioxide may be removed through tubing 34 while oxygen is added through tubing 35 and 36. Blood would flow through the remaining annuli 30, 39; or another dialysis fluid could be circulated, for example, through annulus 39 as a secondary fluid for dialysis of the second dialysis fluid 33. The first and second dialysis fluids 31 and 33 might flow concurrently with the blood flow, or one or both might flow countercurrently thereto. Although the inner tube 34 is shown as a semipermeable member, it may be replaced by a nonpermeable member depending on the application and surface area required.

The present invention is cheaper to manufacture than most blood dialysis devices and accomplishes dialysis with greater ease, efficiency and flexibility and less time, resulting in reduced costs and greater availability to persons requiring such devices. Because of reduced packaging permitted by the increased efficiency of multiple and concentric tubing arrangements, the amount of blood required outside the body for dialytic action with the dialysis exchange fluid is reduced. This results in reduction of blood damage, extra blood cost, complexity and assistance required by the heart for blood flow.

The invention lends itself to use of disposable equipment, including tubing, connectors, exchange fluids, etc., eliminating the high cost of cleaning equipment. Use of disposable items will also give greater assurance of non-contaminating hygenic operation. The compact design and simplified operation of the present invention will permit a person to economically purchase a unit and operate it safely at home. The portable nature of the invention will also permit travel by persons confined in the past to areas near an available dialysis device.

Although the methods and apparatus of this invention have been described with reference to blood conditioning, it should be understood that they could easily be adapted for treatment of other fluids. It is therefore intended that the scope of the invention be limited only by the claims which follow.

What is claimed is:

1. A method of dialytic blood conditioning of a patient's blood in which the blood is continuously removed from the patient's bloodstream, circulated through a dialytic exchange member and returned to said bloodstream; characterized in that said exchange member comprises inner and outer semipermeable tubing members concentrically disposed in an elongated tubular chamber, said blood being circulated through a first annular space between said tubing members, dialyzing fluids being circulated through the said inner tubing member and a second annular space surrounding said outer tubing member, said dialyzing fluid being returned to a reservoir where it is treated by dialysis with a secondary dialyzing fluid, being circulated from a second reservoir.

2. Apparatus for dialytic conditioning of a fluid comprising:
   a dialytic exchange member comprising an elongated tubular chamber having at least two concentric semipermeable tubing members, longitudinally and concentrically disposed therein;
   control and connector means at each end of said exchange member for circulating said fluid through said exchange members for conditioning thereof;
   dialyzing fluid reservoir means; and
   flow means connected to said reservoir means and said exchange member for circulating dialyzing fluid from said reservoir means through said exchange member;
   said reservoir means comprising a first reservoir containing a first dialyzing fluid and a second reservoir containing a second dialyzing fluid, said reservoirs being connected by a flow loop partially comprising a semipermeable exchange membrane whereby dialysis takes place between said first and second dialyzing fluids.

3. A method of dialytic conditioning of a patient's blood in which the blood is continuously removed from the patient's bloodstream, circulated through a dialytic exchange member and returned to said bloodstream; characterized in that said exchange member comprises inner, intermediate and outer semipermeable tubing members concentrically disposed in an elongated tubular chamber, said blood being circulated through a first annular space between said inner and intermediate tubing members, dialyzing fluids being circulated through the said inner tubing member and a second annular space surrounding said intermediate tubing member, a secondary dialyzing fluid being circulated through a third annular space, said outer tubing member defining the interior thereof, for dialysis of the dialyzing fluid in said second annular space.

* * * * *